(12) United States Patent
Hobbs et al.

(10) Patent No.: US 6,870,624 B2
(45) Date of Patent: Mar. 22, 2005

(54) OPTICAL WAVELENGTH RESONANT DEVICE FOR CHEMICAL SENSING

(75) Inventors: Douglas S. Hobbs, Lexington, MA (US); James J. Cowan, Lexington, MA (US)

(73) Assignee: Coho Holdings LLC, Lexington, MA (US)

(*) Notice: Subject to any disclaimer, the term of this patent is extended or adjusted under 35 U.S.C. 154(b) by 362 days.

(21) Appl. No.: 10/001,069

(22) Filed: Oct. 30, 2001

(65) Prior Publication Data

US 2003/0210396 A1 Nov. 13, 2003

Related U.S. Application Data

(60) Provisional application No. 60/244,312, filed on Oct. 30, 2000, provisional application No. 60/283,314, filed on Apr. 12, 2001, and provisional application No. 60/310,399, filed on Aug. 6, 2001.

(51) Int. Cl.⁷ .......................... G01N 21/25; G01N 21/47
(52) U.S. Cl. ..................... 356/416; 356/440; 422/82.05
(58) Field of Search ................................. 356/402, 416, 356/440; 422/82.05, 68.1; 359/573, 569, 565

(56) References Cited

PUBLICATIONS

Cowan, J. J., "Aztec surface–relief volume diffractive structure," Journal of the Optical Society of America, vol. 7, No. 8, pp. 1529–1544 (Aug. 1990).*

* cited by examiner

Primary Examiner—Gregory J. Toatley, Jr.
Assistant Examiner—Roy M. Punnoose
(74) Attorney, Agent, or Firm—Brian M. Dingman, Esq.; Mirick, O'Connell, DeMallie & Lougee, LLP

(57) ABSTRACT

An apparatus for filtering electromagnetic waves, the apparatus comprising a substrate having a surface relief structure containing at least one dielectric body with physical dimensions smaller than the wavelength of the filtered electromagnetic waves, such structures repeated in a two dimensional array covering at least a portion of the surface of the first substrate. Also disclosed is a material sensor utilizing this apparatus.

25 Claims, 14 Drawing Sheets

$W0 = W1 = W2$
$\Lambda 0 = \Lambda 1 = \Lambda 2$ $\Lambda \ll \lambda$
$W \ll \lambda$

PRIOR ART $n_2 > n_1$
$n_2 > n_3$

OPTICAL WAVELENGTH RESONANT DEVICE FOR CHEMICAL SENSING

CROSS-REFERENCE TO RELATED APPLICATIONS

This application claims priority of Application No. 60/244,312 filed on Oct. 30, 2000 entitled "Resonant Reflection Microarray", Application No. 60/283,314 filed on Apr. 12, 2001 also entitled "Resonant Reflection Microarray", and Application No. 60/310,399 filed on Aug. 6, 2001 entitled "Optical Device For Filtering And Sensing", the teachings of which are incorporated herein by reference.

FIELD OF THE INVENTION

This invention is in the field of biological or chemical sensors useful for detecting and identifying chemicals such as pollutants, or biological matter such as DNA or proteins. High speed detection is achieved directly without the use of intermediate chemical labels such as fluorescent materials.

BACKGROUND OF THE INVENTION

Optical sensor systems that can identify and detect the concentration of various materials in a sample, have a great number of applications in the fields of biotechnology and chemical analysis. High sensitivity pollution sensors, for example, are needed to detect the presence of contaminants in water supplies and in the air we breath. A wide range of benefits can be realized in the biotechnology field if a sensor could detect the concentration of viruses and bacteria in a sample of blood or identify various proteins.

Typical biological sensors (biosensors) require fluorescent chemical compounds which are used to "tag" various protein or DNA molecules. When such molecules are deposited onto a surface through attachment or binding to "receptor" chemicals, the presence and concentration of the tagged chemicals can be determined by the brightness of the light emitted by the fluorescent compounds. Recently, this technique gained prominence due to the rapid sequencing of the human genome.

Fluorescence-based biosensors are limited to the extent that the fluorescent compounds used are not applicable to all materials, such as the huge number of proteins generated in the human body. In many applications, a sensitive high speed detection method is needed which does not require the use of fluorescent chemical tags. Such a method can be realized using an optical resonance phenomenon such as the highly complex surface plasmon resonance (SPR), or by ellipsometry, reflectometry, or grating couplers. None of these methods has been developed to the point where high throughput high sensitivity sensors are compatible with long-established diagnostic or research methods such as the use of microtiter plates. Using a surface structure resonance phenomena, the optical filters described herein can be used to produce biosensors capable of detecting minute concentrations of chemicals through a shift in the wavelength of light resonated from the sensor's surface. This type of response cannot be obtained from other filtering methods such as thin-film interference filters and fiber Bragg grating filters.

There are two types of surface structures which can produce the optical resonance signal suitable for chemical detection as disclosed herein. The first type is referred to as an "Aztec" structure in the literature and was disclosed and fully described by Cowan in U.S. Pat. Nos. 4,839,250, 4,874,213, and 4,888,260. Aztec surface structures resemble stepped pyramids where each step height corresponds to one half the wavelength of light which will add coherently upon reflection (one full wavelength in transmission). A typical Aztec surface profile is shown in FIG. 1A. An Aztec structure will act to filter a narrow range of wavelengths out of a broad range of input signals. In general, the width of the filtered range of wavelengths decreases with an increasing number of steps in the Aztec micro-structures. Cowan also noted that the range of filtered wavelengths could be shifted when the density of the material surrounding the structures was varied. A second technique for producing a narrow optical resonance is to exploit a surface structure waveguide effect. Here a multiple-step Aztec structure or a simple single-step array of structures such as holes or posts, can be embedded in a region of high refractive index to create a waveguide resonator. A cross section of such a device is shown in FIG. 1B. Due to their wavelength selective nature, such three or two dimensional structures have received great attention in the recent literature, especially in the context of optical telecommunications and optical computing. They are know in the art as "photonic bandgap" crystals and are being developed for confining and directing light into planar channels which mimic electrical circuits. Using two and three-dimensional guided-mode waveguide resonators as filters is less well-known in the art but has been described in the literature. (See Magnusson U.S. Pat. Nos. 5,216,680, 5,598,300, and 6,154,480. Also, S. Peng and G. M. Morris, "Resonant Scattering from two-dimensional gratings", J. Opt. Soc. Am. A, Vol. 13, No. 5, p. 993, May 1996; R. Magnusson and S. S. Wang, "New Principle for optical filters," Appl. Phys. Lett., 61, No. 9, p. 1022, August 1992.)

Guided mode surface structure resonators produce exceptionally narrow optical resonances. To generate the resonance effect, all of the dimensions in the surface structures, their height, width, and spacing, must be smaller than the wavelengths of light used in the broadband illuminating light. Because the structures are composed of a material with a higher density than the surrounding medium, a waveguide is created in a direction orthogonal to the propagation direction. A narrow range of wavelengths in the illuminating light will be confined and radially propagate a short distance in the plane of the structures, where it will undergo reflection. Waves traveling radially outward in the plane will interfere with waves reflected from the structures allowing the confined beam to leak out of the plane, propagating in a direction opposite the incident direction. Separating these counter-propagating waves is done by several conventional techniques such as beam splitting cubes, optical circulators, waveguide couplers, or grin lens fiber optic collimators.

SUMMARY OF THE INVENTION

This invention discloses the use of the wavelength shift phenomenon described above to detect the presence of various chemicals which bind or attach to the surface of the structures. In addition, in accordance with the invention, when the Aztec micro-step structures are arranged in a circularly symmetric pattern such as a close-packed array of openings resembling a honeycomb, or a series of concentric rings, the resulting resonance is quite efficient regardless of the polarization state of the illuminating light.

Guided mode surface structure resonators produce exceptionally narrow optical resonances, which are a great advantage for the disclosed chemical sensing technique, allowing high-wavelength resolution detection which translates into a high sensitivity device.

Previously not described in the art, when the surface structures in a surface structure waveguide resonator are arranged in a circularly symmetric configuration, the illuminating light can be filtered efficiently without regard to the polarization state of the illuminating light. Such circularly symmetric surface textures with dimensions less than the wavelengths of light employed, can be fabricated in a variety of ways such as with e-beam or optical projection lithography. A preferred method for fabricating such structures is using interference lithography as described by Cowan in U.S. Pat. No. 4,496,216.

A surface structure waveguide optical resonator can also be used as the basis for a sensor. This invention discloses a previously undiscovered optical effect where the range of wavelengths resonated from a surface structure waveguide optical resonator can be shifted toward longer wavelengths in response to an increase in thickness of a thin layer of material deposited on the surface of the structures. The same effect can be observed when a thin layer of material accumulates on the surface of an Aztec structure.

One aspect of the present invention involves a guided-mode resonance surface structure optical filter that does not exhibit polarization dependence. That is, an incident beam of light need not be properly oriented so that it strikes the device in a particular way for the incident light to be adjusted properly. Instead, incident light having any polarization orientation can be adjusted. This is achieved via a circular symmetry supported by an array of shaped surface structures with various cross-sectional shapes such as cylindrical, elliptical or rectangular posts or holes. One or more of the dimensions of the surface structure are necessarily smaller than the wavelength of light that is reflected such that no light is scattered or diffracted.

Another aspect of the present invention is directed toward providing an optical wavelength filter device for filtering wavelengths in optical sensor systems. Typically, a filter structure according to certain principles of the present invention experiences minimal loss due to a polarization state of incoming light. This is achieved by providing a guided-mode surface structure filter that is formed of dielectric bodies of various predetermined shapes such as cylinders or holes repeated over the surface of a substrate and arranged in a predetermined circularly symmetric pattern such as concentric rings, or a honeycomb or hexagon. It is noted that the term "body" as used herein may include "holes" filled with air or some other dielectric material.

A honeycomb surface pattern of such bodies can provide a high degree of circular symmetry, which allows a light beam comprising a broad range of wavelengths to be filtered efficiently without undue loss caused by the polarization state of incident light. In other words, the optical device according to the present invention can be polarization independent. Such a hexagonal array of bodies is preferred over the perfect circular symmetry of a series of concentric rings which requires that a light beam be precisely centered.

Another aspect of the present invention is directed towards an optical filter having one or multiple guided-mode surface structures to reflect a narrow range of light wavelengths from a broad spectrum of incident light. A surface structure can include a body of material forming an array or field of cylindrical holes, cylinders, squares, post, lines, or other suitable shapes.

Another aspect of the present invention involves providing a guided-mode surface structure optical filter capable of reflecting a narrow range of light wavelengths out of a broad spectrum of incident light. The center or peak wavelength within a narrow range of reflected wavelengths can shift in response to the accumulation of material deposited on the surface of the filter. Such an optical device can be operated as a sensor in which a displacement of the peak reflected wavelength indicates the thickness of the deposited material layer. Generally the optical device can be used to detect the presence of any semi-transparent material such as water or solvents, condensates from a vapor, organic material such as proteins, DNA, and bacteria, and chemical pollutants. In one application the optical device is a guided-mode surface structure filter with depressions or bodies (protrusions) repeated over the surface of a substrate in a linear or two-dimensional array. One embodiment of the optical device includes the polarization independent honeycomb arrangement of dielectric bodies as discussed herein.

One embodiment of the present invention involves providing a highly sensitive detection method for biotechnology and chemical analysis that does not require the use of fluorescent chemical tags. Such a method can be realized using an optical resonance phenomenon such as the highly complex surface plasmon resonance (SPR). Using a surface structure resonance phenomenon, the optical filters described herein can be used to yield sensors capable of detecting minute concentrations of chemicals based on a shift in the wavelength of light resonated from the sensor's surface.

Figure 1A:
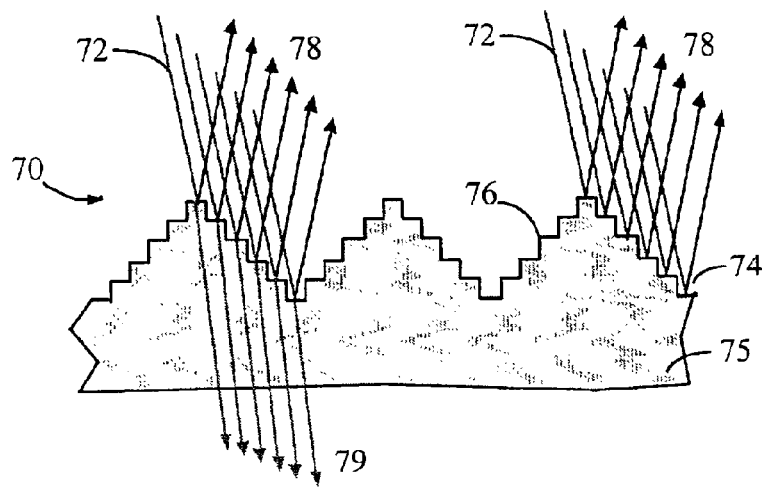
FIG. 1A is a cross sectional view of a 5 step prior art surface structure depicting rays of light being partially reflected from each step to generate reflected and transmitted beams.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1B:
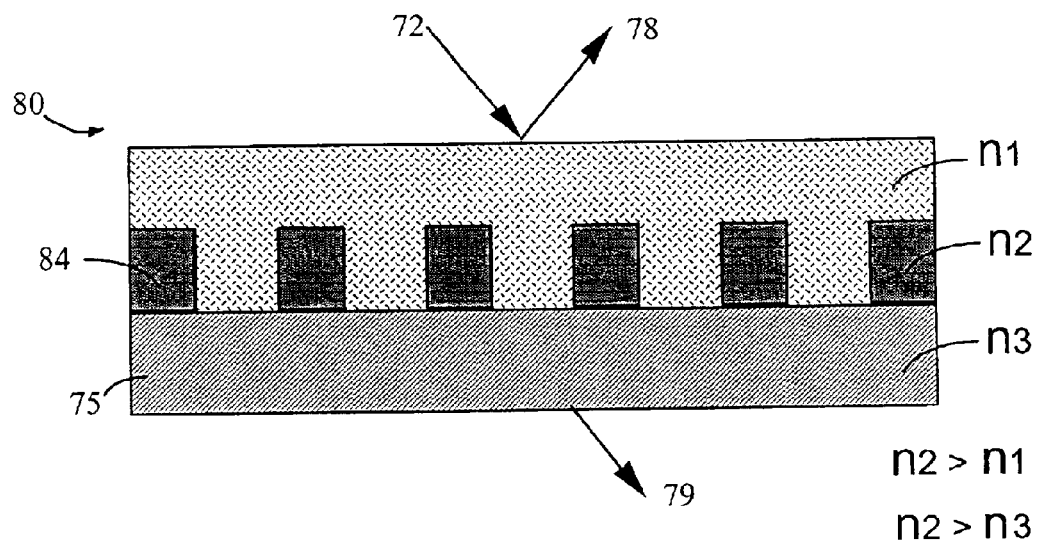
FIG. 1B is a cross sectional view of a prior art single step surface structure forming a structural waveguide for an incident light beam. The optical index of refraction of the material composing the single step structure $n2$, is greater than the surrounding materials, $n1$ and $n3$.

Prior art surface structure filters suitable for use as chemical sensors operate on free space optical beams, and their function can be described by a combination of prevailing theories as depicted in FIGS. 1A–1B. In FIG. 1A an Aztec Surface Structure Resonance 70 is shown where an incident optical beam containing a broad range of wavelengths 72, is partially reflected 74 from phase transitions or steps 76 comprising a structure on the surface of a substrate 75, each reflection adding coherently for only a narrow range of light wavelengths in a reflected beam 78, and having no affect on other wavelengths passed in a transmitted beam 79; in FIG. 1B a guided mode surface structure resonance device 80 is shown where a filtered reflected beam 78 is created only for a light wavelength matching the transverse variation of density 84 imposed by the surface structure shape and composition.

Figure 7A:
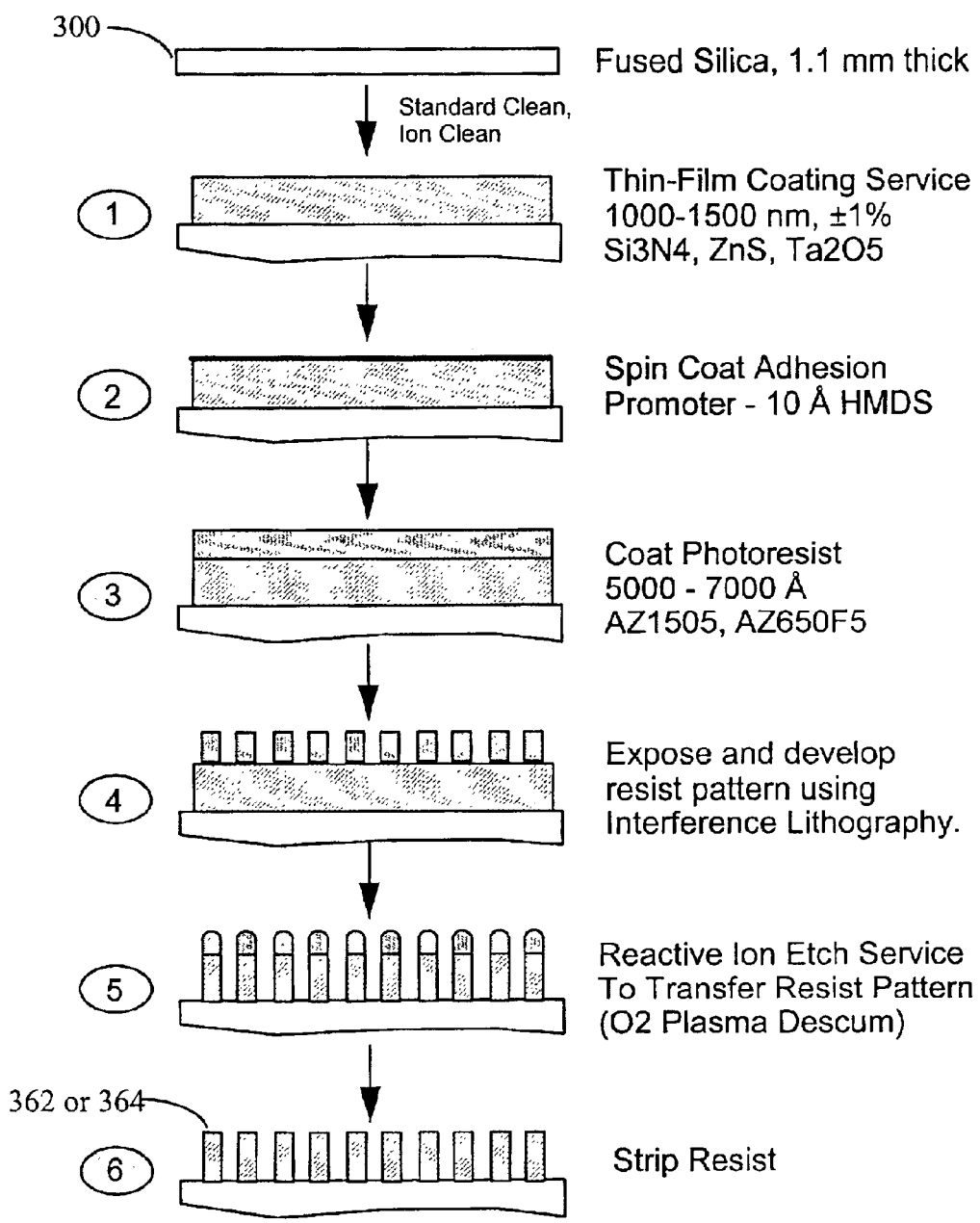
FIG. 7A is a process flow chart of an etching technique for fabricating surface structures according to certain principles of the present invention.
Figure 7B:
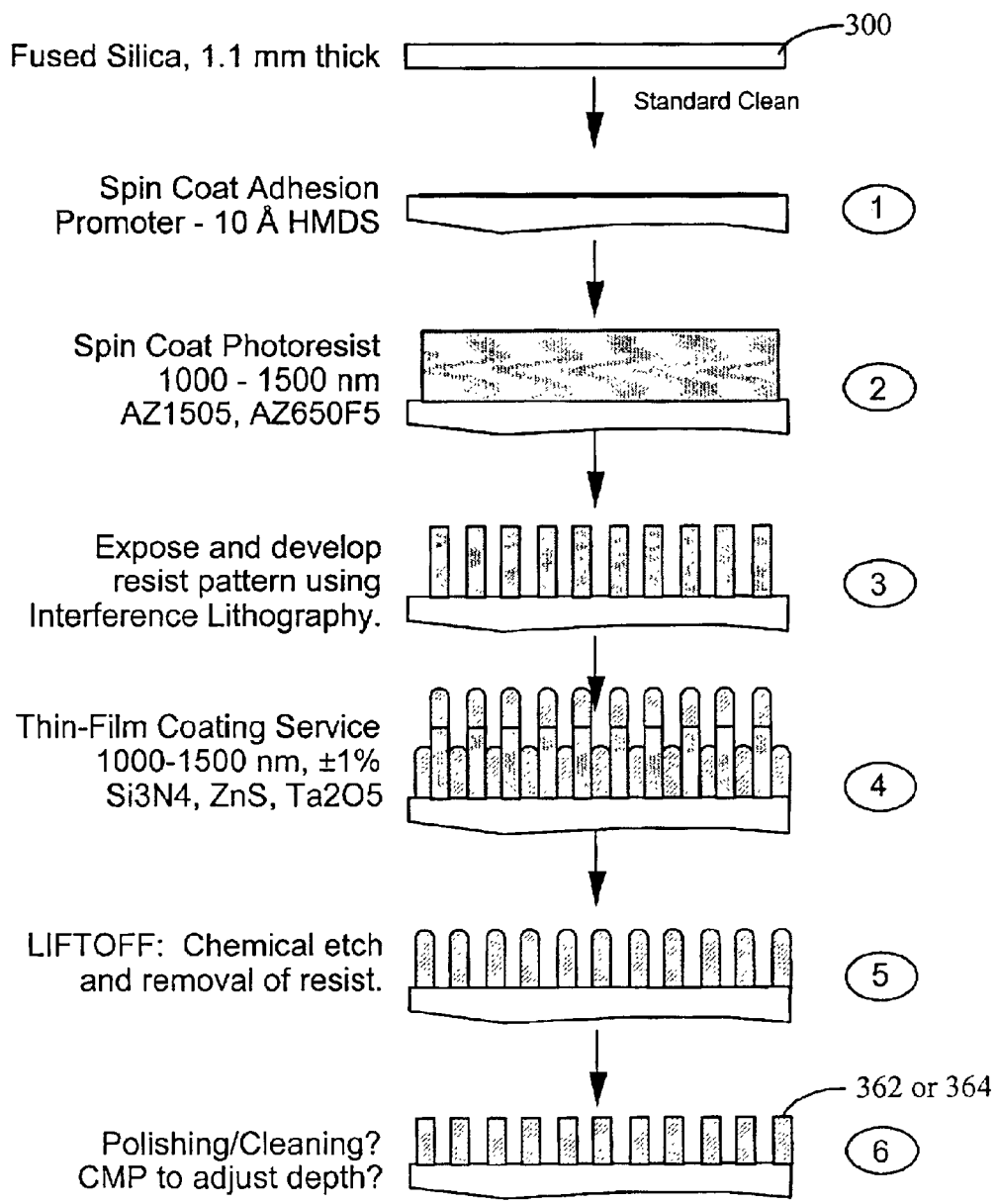
FIG. 7B is a process flow chart of a lift-off technique for fabricating surface structures according to certain principles of the present invention.

As shown in the process FIGS. 7A and 7B, surface textures 362 and 364 can be fabricated on a substrate 300 using interference lithography techniques, embossing, etching, optical lithography, or other standard techniques used within the semiconductor or related industry. For example, a surface texture can be formed via a recording layer (typically composed of a photosensitive medium known as photoresist 302) used as a mask for a subsequent etching process to transfer the recorded pattern into a thin film layer. This etch process is shown in FIG. 7A. An alternative process for fabricating the surface textures is known as a liftoff process, and is shown in FIG. 7B. In the liftoff process the recording layer, again typically photoresist, is patterned on the substrate before deposition of a thin film. After depositing a thin film, the resist is removed using a solvent leaving an inverse pattern in the deposited thin film layer.

Figure 8A:
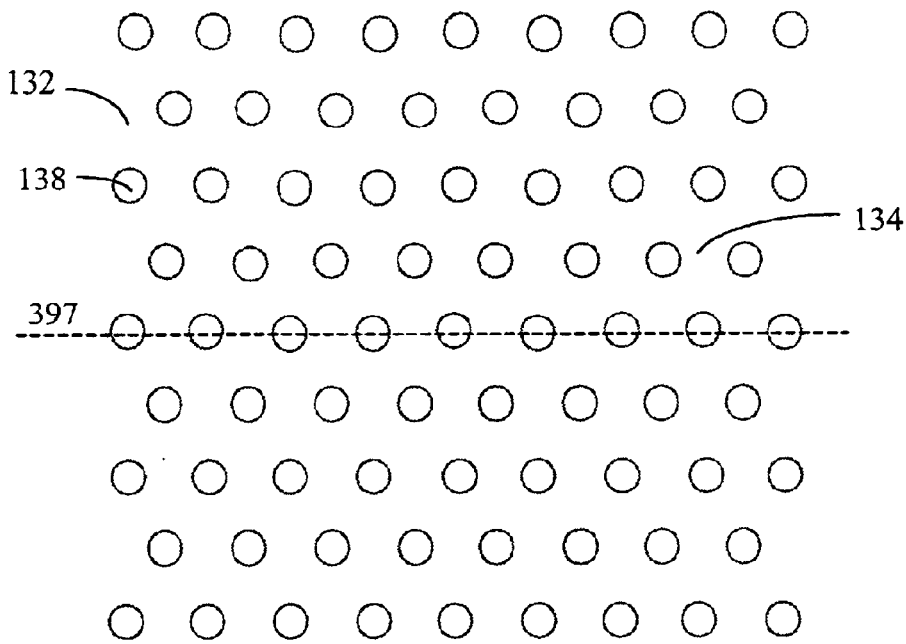
FIG. 8A is a top view of a surface structure of an optical sensor device for detecting deposited materials according to certain principles of the present invention.
Figure 8B:
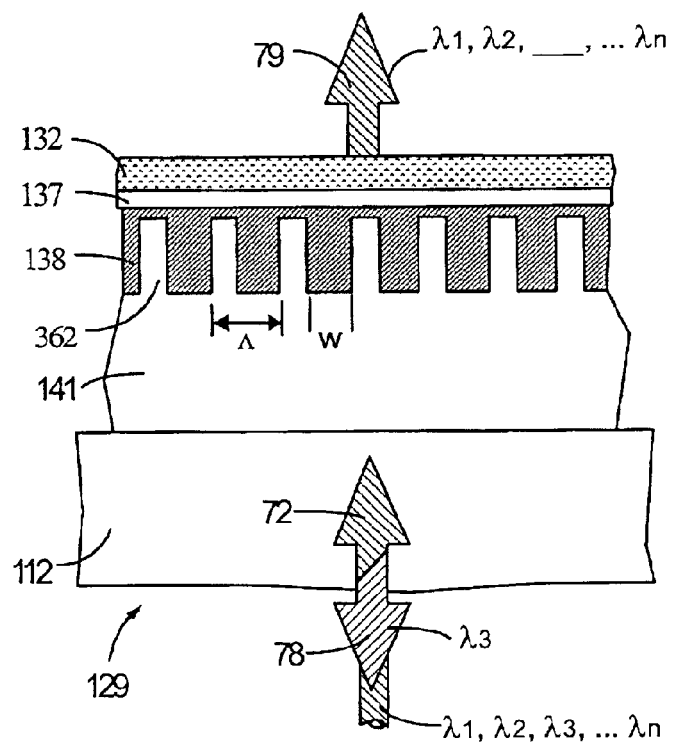
FIG. 8B is a cross-sectional view of a surface structure of an optical sensor device for detecting deposited materials according to certain principles of the present invention.

FIG. 8B shows a cross section of a typical optical device 129 of the disclosed invention. Surface textures 362 typically absorb little or no optical energy and can be formed from materials such as zinc sulfide, zinc selenide, silicon nitride, titanium oxide, niobium oxide, tantalum pentoxide, aluminum oxide, or other suitable material. For the sensor devices described herein, an underlying dielectric layer, the device substrate, an overcoated dielectric layer, or the surface texture can be made of a conductive material such as indium oxide, indium tin oxide, or vanadium oxide to allow an electric field to be applied. These materials tend to exhibit low absorption. Suitable substrate materials can include silicon, indium phosphide, gallium arsenide, germanium, zinc sulfide, zinc selenide, and any non-absorbing glass such as fused silica, quartz, or BK7. Preferred materials for disposable sensor applications include many forms of plastic such as polycarbonate, polystyrene, vinyl or acrylic. Other suitable materials can be used in lieu of these materials.

For optical device 129 shown in FIG. 8B, substrate 112 can be formed of transparent non-absorbing material such as glass, which provides structural support for surface texture 362. In the application as shown, substrate 112 can have an index of refraction in the range near 1.45 to 1.55 while the bodies 138 such as holes or columns have an index of refraction between 1.7 and 2.2. These values can also vary outside the ranges depending on the application, or can be reversed where substrate 112 has the higher refractive index range.

Figure 2:
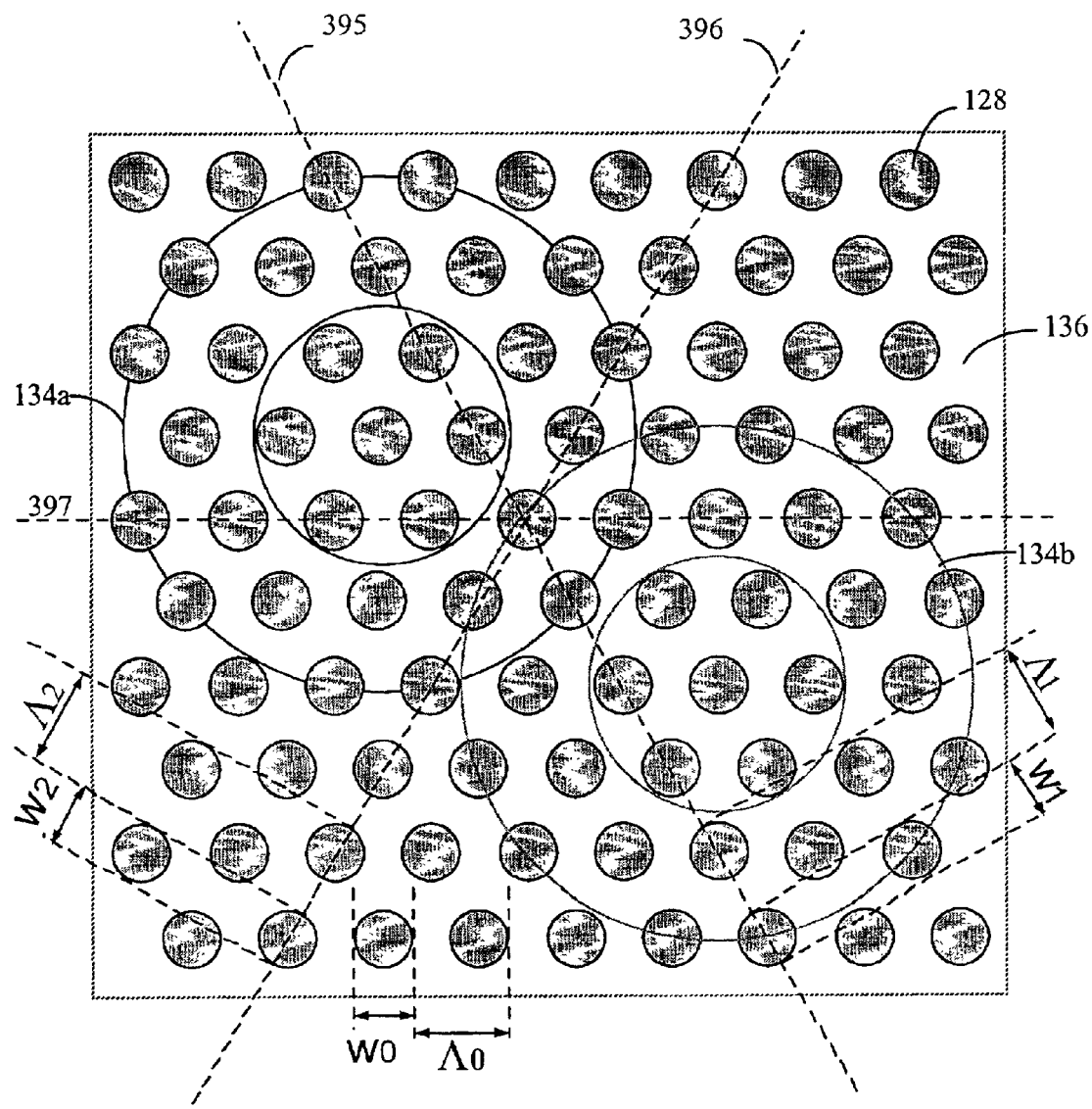
FIG. 2 is a top view of a surface structure of an optical device for filtering wavelengths according to certain principles of the present invention.

Operational characteristics of optical device 129 depend in part on the surface pattern of the surface texture, 362. As shown in FIG. 2, a surface texture can include an array of cylindrical bodies 128, each of which has an index of refraction between 1.7 and 2.2. The index of refraction of this material also can be any suitable value inside or outside of this range.

In an alternative embodiment, surface texture 362 can be fabricated from a solid block, slab, film or layer of material in which cylindrical holes or bodies 128 are formed. As discussed, surface textures can be the inverse of the layer as shown. For example, the surface structure can be an array of cylinders filled with a fixed dielectric or adjustable dielectric material.

In the application as shown in FIG. 2, holes or cylinders 128 form a honeycomb pattern having symmetry about three axes 395, 396 and 397 intersecting at 60 degree angles. Axes 395, 396 and 397 illustrate the symmetry of the hexagonal or honeycomb pattern in a transverse direction to incident light perpendicular to the plane of the dielectric bodies. Based on use of the honeycomb pattern and its orientation, the state of the optical electric field, or polarization of incident light 72 need not be oriented along any particular axis. That is, circular patterns 134a and 134b illustrate locations in which incident light can be directed towards the optical device. Regardless of a location where incident light strikes a surface of optical device 129, incident light 72 can be exposed to a similar non-polarization dependent cross-sectional pattern. Accordingly, optical device 129 is not necessarily polarization dependent.

A notable feature of surface texture 362 is the polarization independence associated with the symmetry of the honeycomb pattern. As shown, there are three axes along which an incident light 72 perpendicular to the plane of the array will encounter an identical cross section. Because of the circular symmetry created by the relative locations of each body 128 (hole or column) in the array, and because the pattern pitch is identical on each of three axes spaced 120 degrees apart, ensuing resonance of light energy is unaffected by the orientation of the electric field, i.e., polarization of the incident light. This polarization independence is unique to this type of hexagonal or honeycomb grating structure, and can be beneficial for use in sensor applications. Notice also that a honeycomb array according to the principles of the present invention has a high degree of circular symmetry regardless of where an optical beam is incident to the array, as indicated by circles 134a and 134b.

Although FIG. 2 illustrates the use of just one surface texture, 362, any number of surface textures can be used in optical device 129. Typically, a higher number of parallel surface textures used in optical device 129 results in a more rectangular filter response. A single surface texture can also be used.

Figure 3:
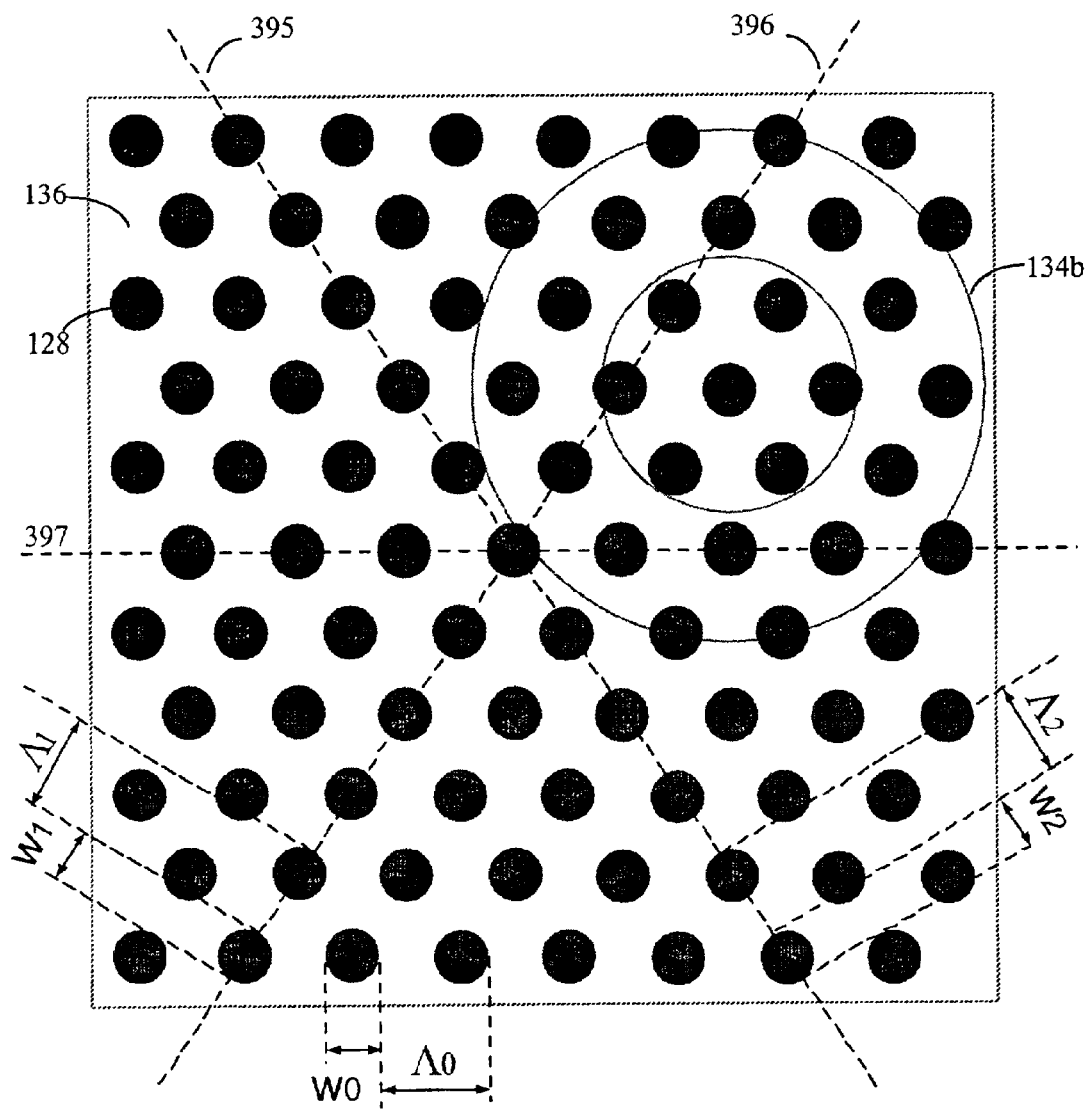
FIG. 3 is a top view of a surface structure of an optical device for filtering wavelengths according to certain principles of the present invention.

FIG. 3 is a top view of a surface texture according to certain principles of the present invention. As shown, a spacing between holes or cylinders 128 can be adjusted to provide a single or multiple maxima response around a selected center frequency. For example, multiple resonances of incident light 72 along separate axes can be slightly shifted due to asymmetries in the surface pattern of the first surface texture and the second surface texture so that an overall output of optical device 129 includes multiple superimposed resonances. A combination of three slightly shifted resonances along 3 axes of optical device 129 can produce any desired filter response.

Adjusting the filter response can also be achieved by having a slightly different pitch (distance between dielectric bodies) along 3 axes of optical device 129 as particularly described in FIG. 3.

Figure 5:
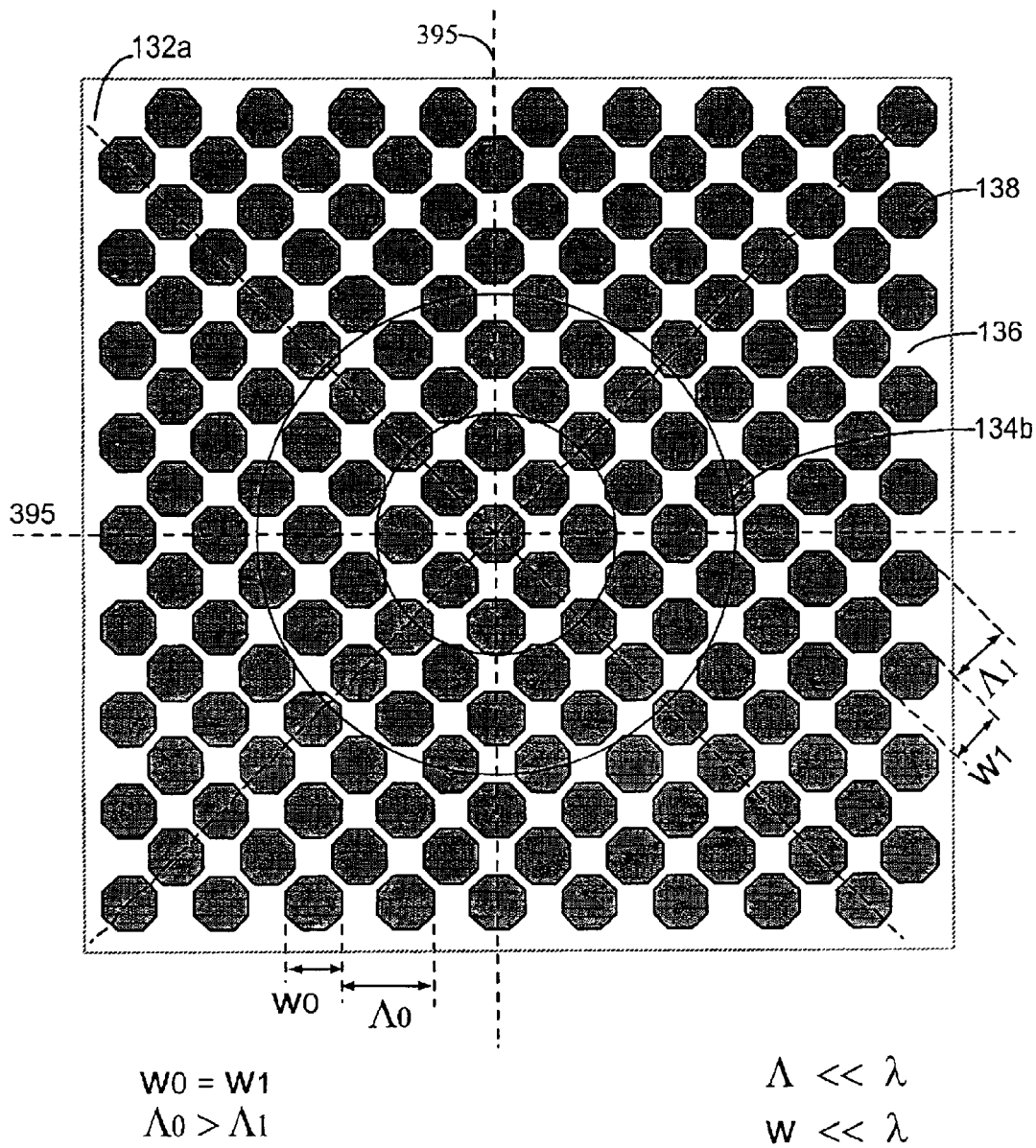
FIG. 5 is a top view of a surface structure of an optical device for filtering wavelengths according to certain principles of the present invention.

Another method for adjusting the response of optical device 129 is to change the duty cycle (i.e., the ratio of the area of the dielectric bodies to the spacing between bodies) along 3 axes of optical device 129. The duty cycle can be varied along separate axes of the surface texture 362 by a change in the cross-section of the dielectric bodies. Note that as shown in FIG. 5, dielectric bodies arranged on a square grid can also serve to broaden the pass band of the filter but at the expense of a greater polarization dependence. Any combination of these and other methods can be used to adjust characteristics of optical device 129.

Figure 4:
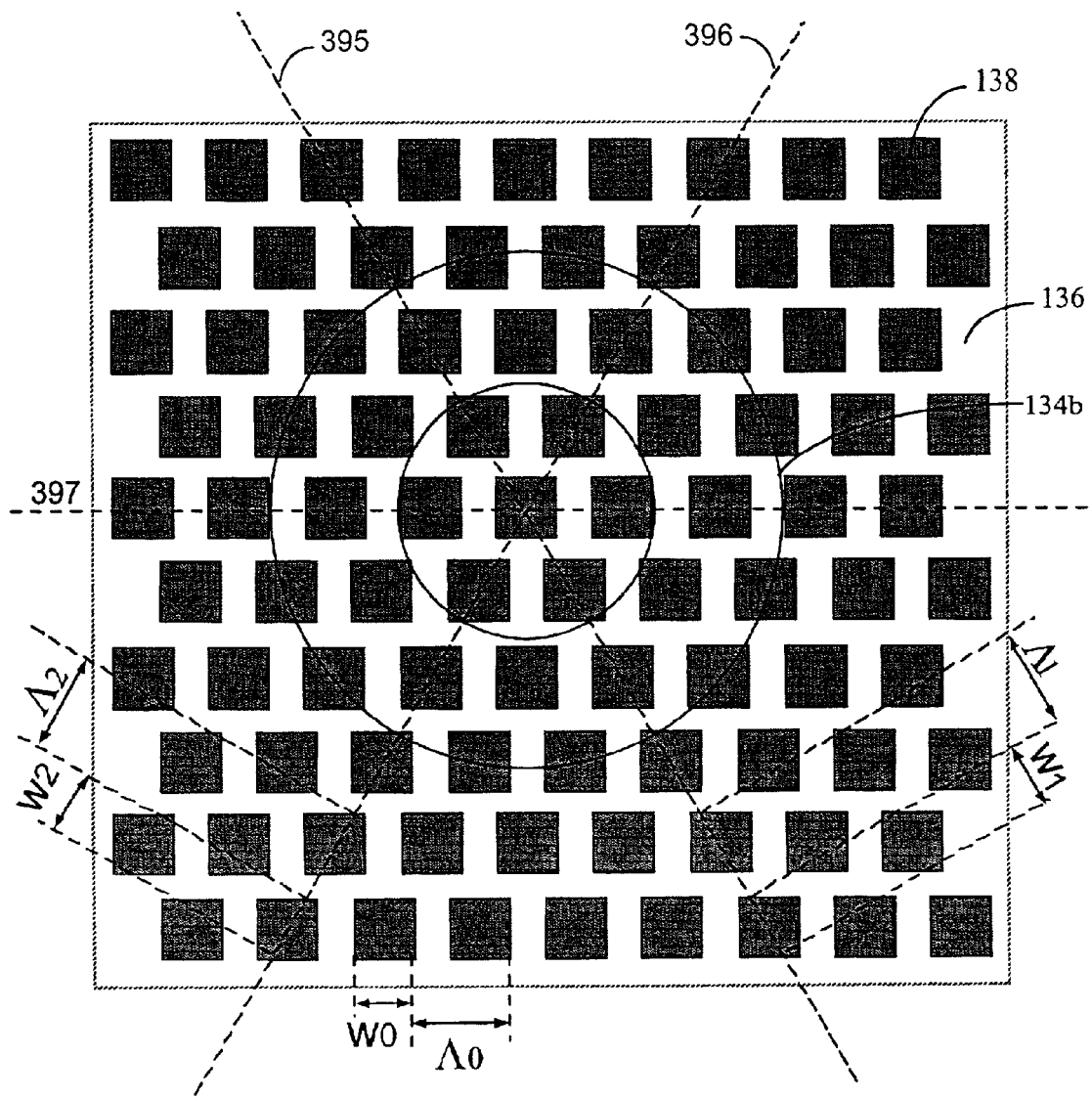
FIG. 4 is a top view of a surface structure of an optical device for filtering wavelengths according to certain principles of the present invention.

FIG. 4 is a top view of a surface texture illustrating a field of square cross-section dielectric bodies according to certain principles of the present invention. Generally, this pattern effects a resonance of light reflected or guided through the device. In this embodiment, the square shaped holes or columns are arranged again in a honeycomb pattern where the individual features are equally spaced along three axes that meet at 60°, labeled 395, 396, and 397. This arrangement leads to circular symmetry as indicated by circle 134$b$, but the cross section of the square columns is different along axis 397 than along 395 and 396. Any suitable shape can be used to form surface texture 362.

FIG. 5 is a top view of a surface texture illustrating a field of octagonal cross-section holes or bodies 138 according to certain principles of the present invention. A square grid is shown where the octagonal columns or holes are arranged along axes which are substantially perpendicular. The degree of circular symmetry gauged by circle 134$b$ is less in this embodiment than with the previous honeycomb embodiments since the number of fundamental axes has been reduced from three to two. The octagonal shape and square grid has an effect on the polarization state of passing light.

Figure 6:
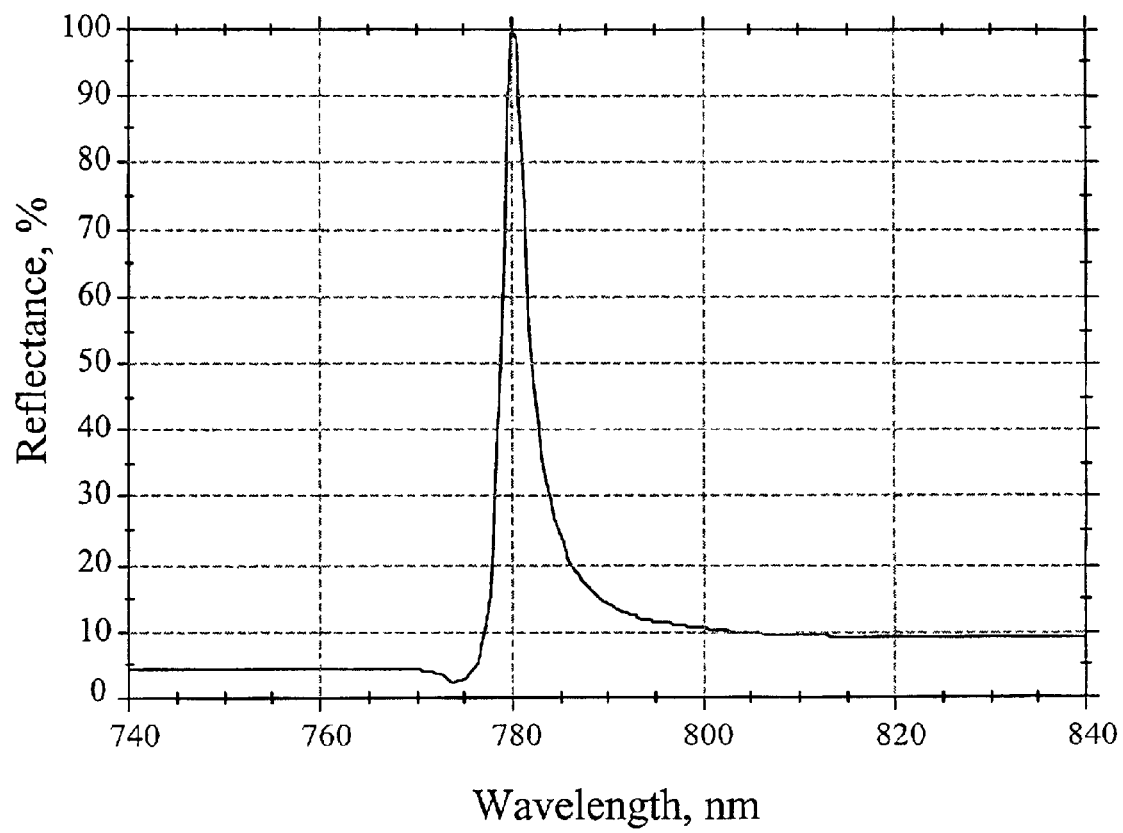
FIG. 6 is a graph illustrating a resonance of a bandpass of wavelengths from an optical filter device according to certain principles of the present invention.

FIG. 6 is a graph illustrating the results of a simulation of a guided-mode surface structure resonance filter of this invention designed for chemical or biological sensing applications. As shown, a high percentage of incident light centered around a 780 nanometer wavelength is redirected as reflected light from just a single surface texture 362 of optical device 129. Incident light at other wavelengths such as above 800 nanometers and less than 775 nanometers passes through optical device 129 as transmitted light. As discussed, parameters of optical device 129 can be adjusted to resonate different wavelength ranges of incident light 72.

Figure 8C:
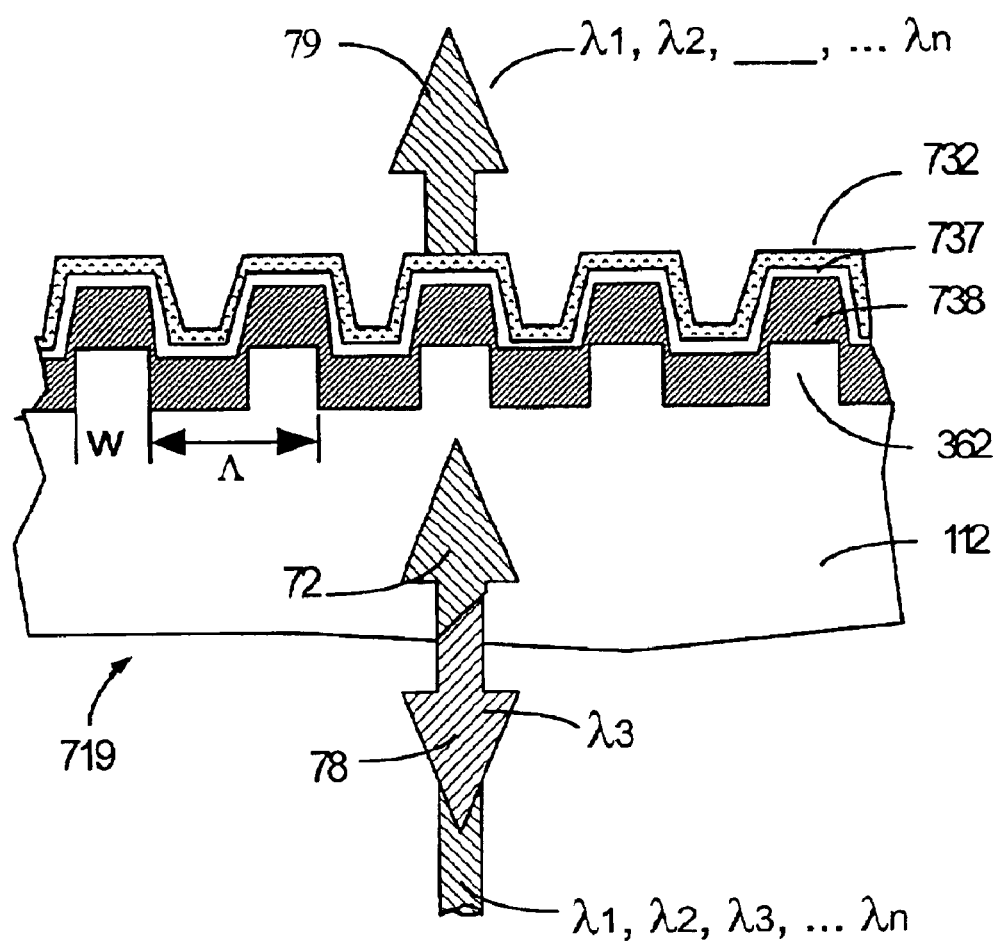
FIG. 8C is a cross-sectional view of a surface structure of an optical sensor device for detecting deposited materials according to certain principles of the present invention.

FIGS. 8A, and 8B are a top view and cross-sectional view of an optical sensor device according to the principles of the present invention. FIGS. 8A and 8C are a top view and cross-sectional view of another optical sensor device according to the principles of the present invention.

In FIG. 8B, a surface texture can be embossed, etched or formed in layer 141 of optical device 129. Although any suitable material can be used to form a surface texture or surface relief pattern, layer 141 can be a polymer such as UV-cured epoxy, a variety of transparent plastics such as acrylic, polycarbonate, polystyrene, and vinyl, or a glass material such as quartz or fused silica. Other suitable materials can be used to form layer 141. As previously discussed, desirable (e.g., honeycomb) surface patterns of bodies or holes such as cylindrical shaped textures can be formed in layer 141. The surface texture of layer 141 can vary depending on the application.

Layer 138 can be coated over layer 141 using a suitable method such as spin-coating. For example, a surface relief pattern or texture in layer 141 can be filled or overlaid with another material layer 138 to produce a flat surface onto which layer 137 can be deposited or coated. Layer 138 can include an excess of material over what is necessary to fill the surface texture of layer 141.

Layer 138 desirably has a very low optical absorption, and can be a coating of non-absorbing dielectric material such as silicon nitride, zinc sulfide, titanium oxide, indium oxide, niobium oxide, tantalum pentoxide, or other suitable material. Typically, these materials have an optical index of refraction in the range of 1.8 to 2.4.

In a biotechnology application, layer 137 can be a receptor layer such as a receptor chemical or link layer. Layer 137 can then be exposed to other material that chemically binds or deposits onto layer 137, forming top layer 132. A thickness of material having a specified or measurable index of refraction forming layer 132 changes the optical characteristics of optical device 129. For example, when a range of wavelengths of incident light 72 ($\lambda 1$, $\lambda 2$, $\lambda 3$, $\lambda 4$, . . . $\lambda n$) interacts with optical device 129, a narrow range of wavelengths are redirected as reflected light 78 ($\lambda 3$), while a remainder of the wavelengths pass through device 129 as transmitted light 79 ($\lambda 1$, $\lambda 2$, _____, $\lambda 4$, . . . $\lambda n$). As the thickness of material layer 132 increases, the narrow range of wavelengths redirected as reflected light 78 is shifted toward longer wavelengths. This change in the peak resonant wavelength, can be measured or identified to determine a thickness of layer 132. Accordingly, optical device 129 can be used as a sensor to detect the presence and quantity of certain matter such as proteins, chemicals, molecules, or other matter in a sample solution or substance. In one application, the wavelength of passing light 79 or reflected light 78 can be monitored over time to determine a rate at which layer 132 is deposited onto layer 137.

Another embodiment for measuring a thickness of a deposited material is shown in FIG. 8C. Similar results as previously discussed can be achieved using this embodiment. However, the cost associated with manufacturing optical device 719 is generally reduced over the optical device 129 as described in FIG. 8B. As shown in FIG. 8C, layer 141 is eliminated and a surface texture is embossed, etched or formed in substrate 112. The textured surface of the substrate can be any suitable pattern such as those previously discussed.

Layer 738 deposited on surface texture 362 of substrate 112 can be a conformal coating of non-absorbing dielectric material such as silicon nitride, zinc sulfide, titanium oxide, indium oxide, niobium oxide, tantalum pentoxide or other suitable material. Typically these materials have an optical index of refraction in the range of 1.8 to 2.4. However, the material can vary depending on the application.

A method for producing layer 738 is vacuum deposition. As shown, layer 738 is deposited evenly on surface texture 362 of substrate 112. Thus, layer 738 itself can form a similar surface texture as that originally formed on the surface of substrate 112.

Layer 737 such as a receptor layer can be deposited on textured layer 738. This can also be a conformal coating of material such as a specific receptor chemical.

As previously discussed, subsequent layer 732 can be deposited on layer 737 to change the characteristics of optical device 719. Typically, layer 732 will be deposited in a conformal manner over 737.

In a biotechnology application, layer 737 can be a receptor layer such as a receptor chemical or link layer. Layer 737 can then be exposed to other material (having a corresponding index of refraction) that chemically binds or deposits onto layer 737, forming top layer 732. A thickness of material having a specified or measurable index of refraction forming layer 732 changes the optical characteristics of optical device 719. For example, when a range of wavelengths of incident light 72 ($\lambda 1, \lambda 2, \lambda 3, \lambda 4, \ldots \lambda n$) interacts with optical device 719, a narrow range of wavelengths are redirected as reflected light 78 ($\lambda 3$), while a remainder of the wavelengths pass through device 719 as transmitted light 79 ($\lambda 1, \lambda 2, \_\_\_\_\_, \lambda 4, \ldots \lambda n$).

As the thickness of material layer 732 increases, the narrow range of wavelengths redirected as reflected light 78 is shifted toward longer wavelengths. This change in the peak resonant wavelength can be measured or identified to determine a thickness of layer 732. Accordingly, optical device 719 can be used as a sensor to detect the presence and quantity of certain matter such as proteins, chemicals, molecules, or other matter in a sample solution or substance. In one application, the wavelength of passing light 79 or reflected light 78 can be monitored over time to determine a rate at which layer 732 is deposited onto layer 737.

Figure 9:
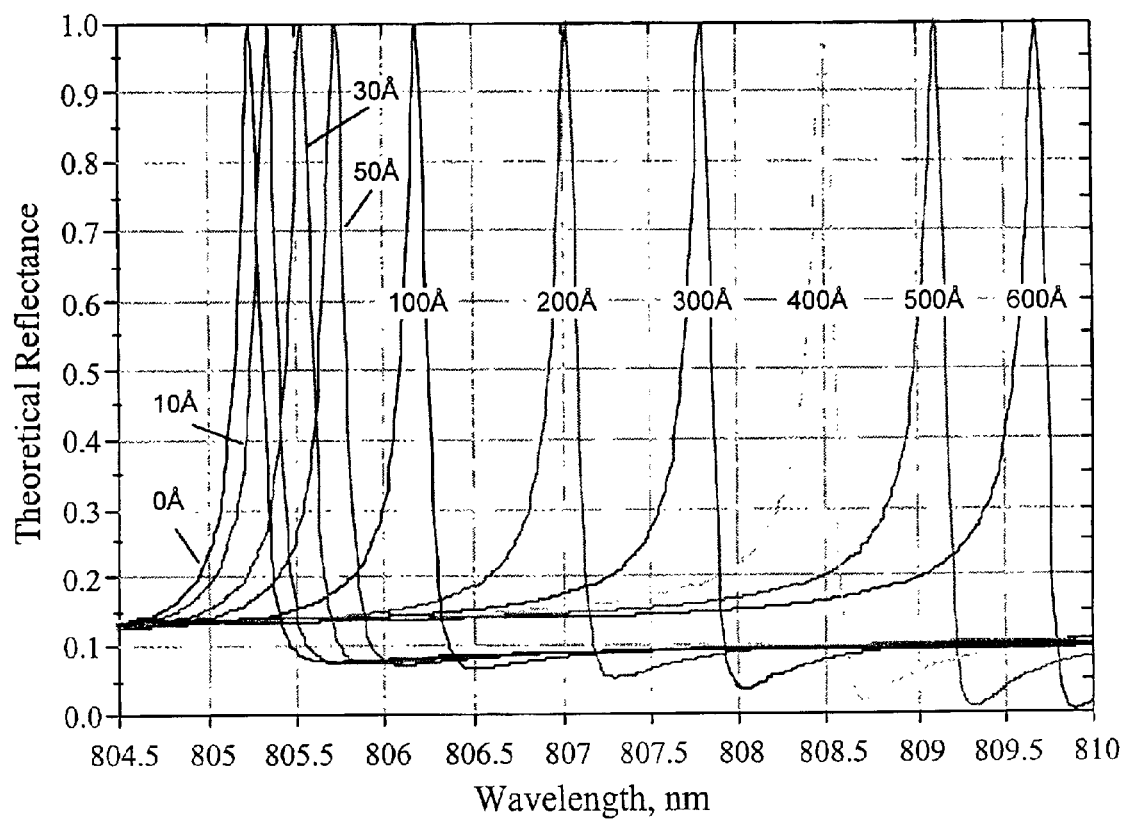
FIG. 9 is a graph illustrating a shift of a bandpass of wavelengths versus thickness for an optical sensor device according to certain principles of the present invention.

FIG. 9 is a graph illustrating a range of reflected light depending on thickness of a deposited layer according to certain principles of the present invention. Multiple reflected signals are shown where the peak wavelength of the reflected signal is shifted toward longer wavelengths as the thickness of material comprising layer 132, 732 increases.

In the embodiment corresponding to the graph, the surface texture includes cylindrical shaped columns projecting from a polycarbonate substrate to a height, h3, in a range of 140 to 200 nm (nanometers). Column bodies in the surface texture have a cross-sectional diameter, w, in the range of 240 to 280 nm, and are arranged in a honeycomb pattern. The bodies are spaced in a range between 490 to 530 nm. All of these parameters can vary depending on the application.

As shown, an optical resonance is identified for a corresponding optical device at a wavelength at or near 805 nm when no material layer such as 132 or 732 is deposited on corresponding optical devices 129 and 719 respectively. As the thickness of layer increases to 100 Angstroms, a peak reflected wavelength shifts to around 806.2 nanometers. At a thickness of 400 Angstroms, the wavelength of reflected light shifts to around 808.5 nanometers. Generally, the change in wavelength shift relative to a change in thickness is linear within a small range.

Layer 138, 738 are typically formed or made of a non-absorbing dielectric material such as silicon nitride, zinc sulfide, titanium oxide, indium oxide, niobium oxide, or tantalum pentoxide, all with optical index of refraction values in the range of 1.8 to 2.4. Layers 137 and 132 are made of non-absorbing materials with a substantially similar refractive index. In general the sensitivity of the sensor as indicated by the magnitude of the shift in the peak wavelength of the reflected light for a given thickness of the material layer 132, 732 is highest when the thickness of material layer 138 is minimized. Accordingly, more sensitive optical devices can be produced using thinner coatings for layers 138, 738.

Figure 10:
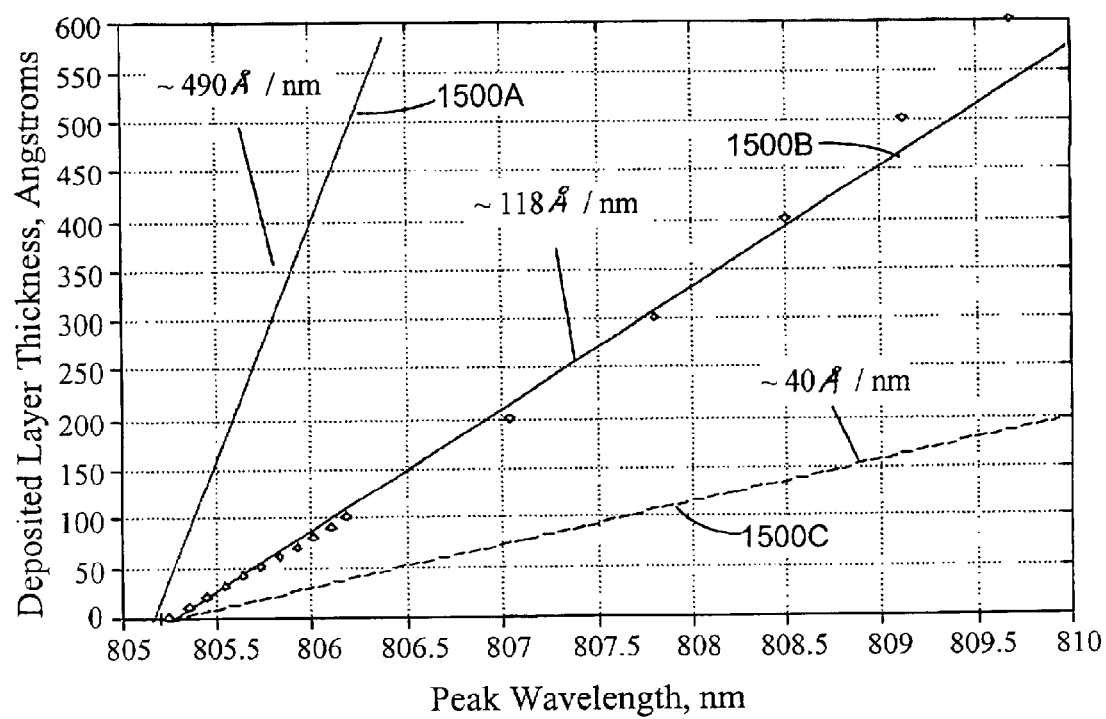
FIG. 10 is a graph illustrating a relationship between the thickness of a surface material layer and peak resonance wavelength reflected from an optical sensor device according to certain principles of the present invention.

FIG. 10 is a graph illustrating sample sensitivity of two embodiments of a guided mode surface structure sensor according to certain principles of the present invention. Each embodiment shows a linear relationship between a peak wavelength shift and thickness of a corresponding deposited material layer. When the thickness of the material layer increases above 1500 Angstroms, the optical sensor devices tend to saturate (i.e., become non-linear). Curves 1500A, 1500B and 1500C each provide a different optical sensitivity depending on dimensions of the corresponding optical device. Curve 1500C is preferred in applications requiring a greater change in shifted wavelength for a corresponding given change in thickness. In such applications, less accurate wavelength measurement devices can be used to measure a thickness of deposited material.

Figure 11:
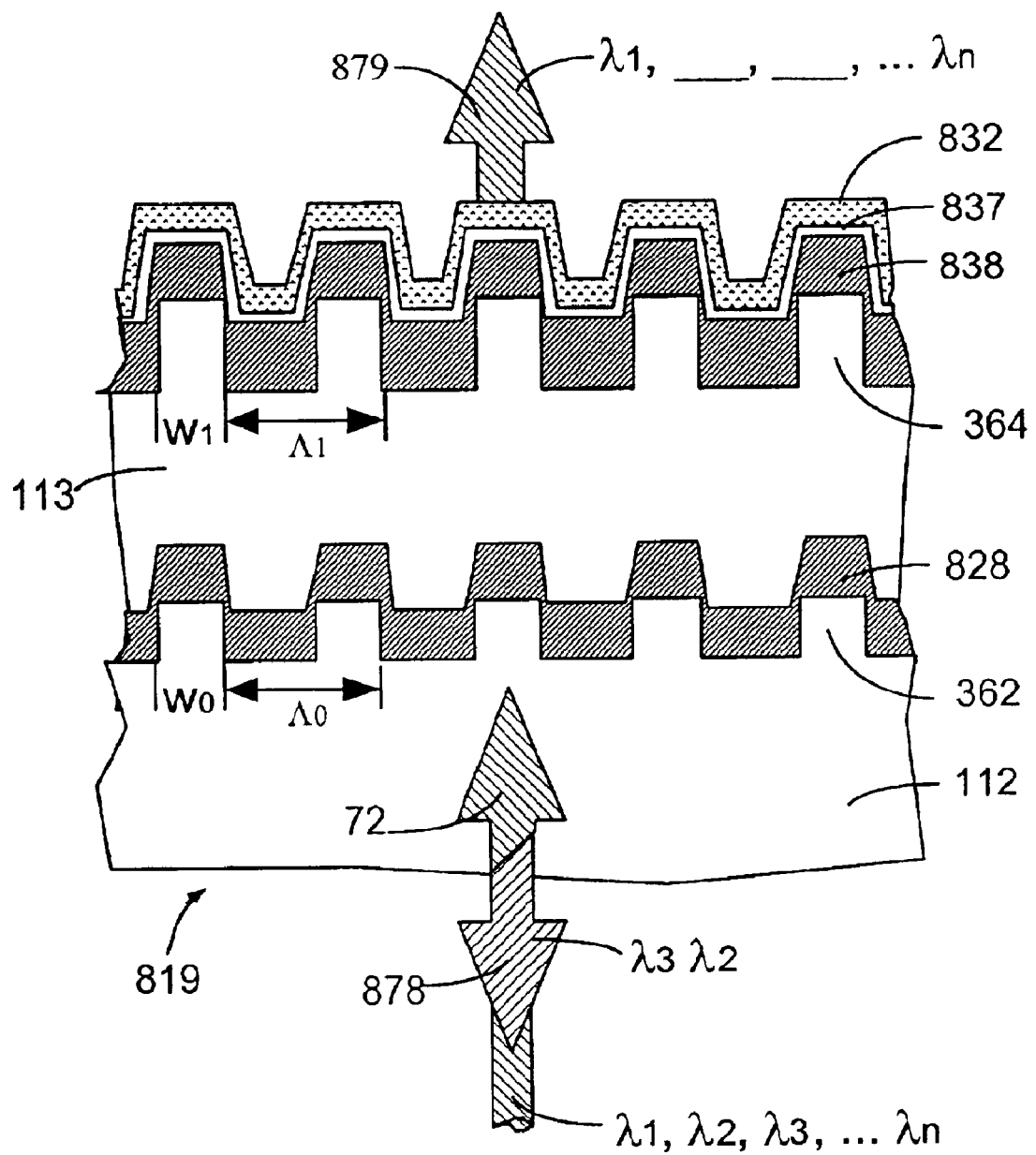
FIG. 11 is cross-sectional view of a surface structure of an optical sensor device according to certain principles of the present invention.

FIG. 11 is a double structure sensor in which first and second resonance structures simultaneously produce a static reference signal and a sensor signal (that is used to measure a deposited layer thickness), respectively.

Broadband incident light $\lambda 1, \lambda 2, \lambda 3, \ldots \lambda n$ is directed towards transparent substrate 112. Generally, a first resonance surface texture is formed by the interface of textured layer 828 between substrate 112 and 113. A second resonance surface texture is formed by the interface of materials including substrate 113, layer 838, receptor layer 837, and deposited variable thickness layer 832. Based on this embodiment, two narrow ranges of wavelengths of light are redirected as reflected light 878 (namely $\lambda 2$ and $\lambda 3$), while $\lambda 1, \_\_\_\_\_, \_\_\_\_\_, \lambda 4, \ldots \lambda n$ pass as transmitted light 879.

One wavelength of incident light redirected as reflected light 878 can be used as a reference signal while the other light that is resonantly reflected can be used as a signal whose optical wavelength shifts based on a thickness of layer 832.

An advantage of this embodiment is that common mode variations due to temperature and other ambient conditions can be eliminated. In other words, a difference in wavelength between the two resonantly reflected signals (reference and signal) can be used to more accurately determine a thickness of layer 832.

In another embodiment, the static reference resonance is not produced by an embedded surface texture 828 but rather is produced by an embedded multiple layer thin film stack coated onto substrate 112. Surface texture 838 supported by substrate 113 is laminated to the thin film stack coated on substrate 112 such that surface texture 838 is on an outside surface of the completed sensor.

In a typical application, a difference in wavelength between $\lambda 2$ and $\lambda 3$ increases in response to an increasing thickness of the deposited material layer 832. Both the "reference" and "signal" wavelength shift an equal amount due to temperature changes or other ambient conditions so that the difference in wavelength between signals is generally constant.

In certain applications, both the reference and signal peak wavelength can vary based on a change in thickness of layer 832. In such an application, the conversion from a measured difference in wavelength is not necessarily linear.

Figure 12:
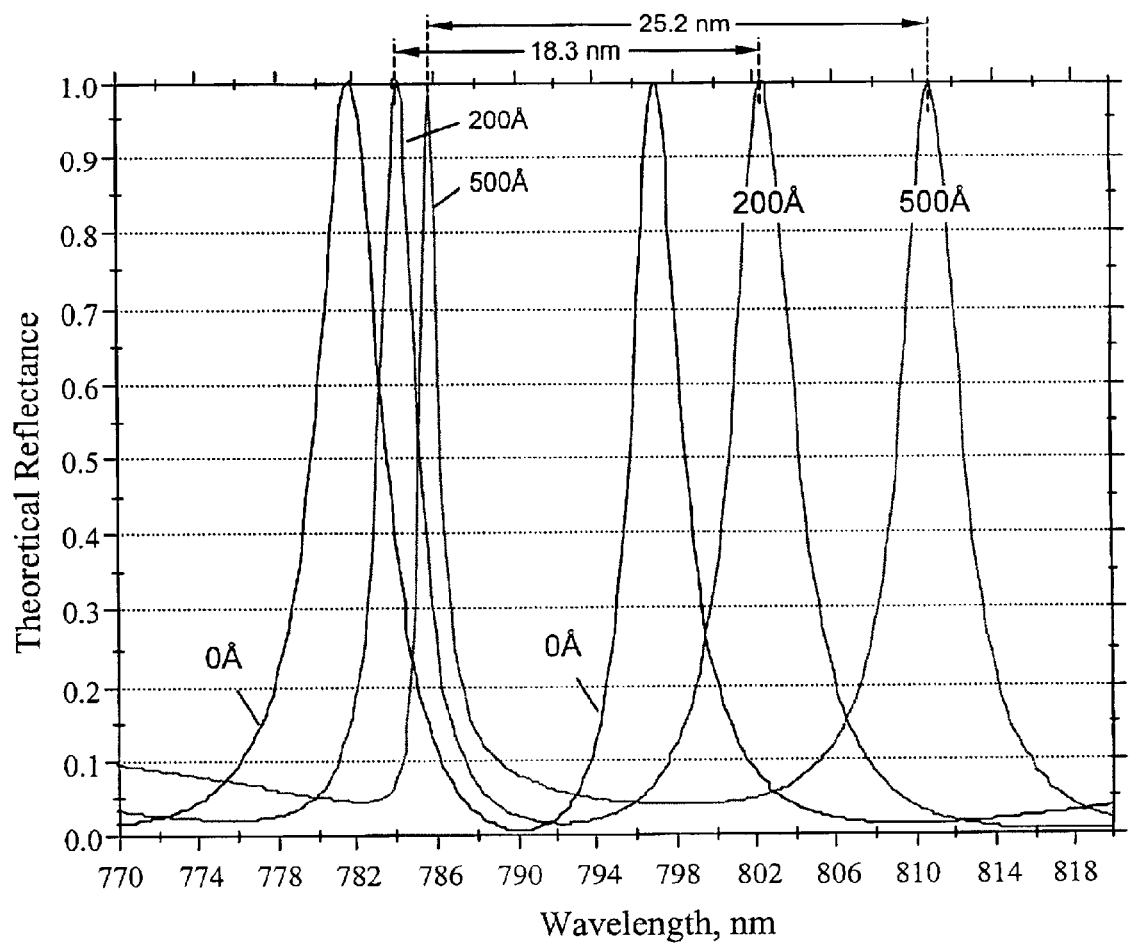
FIG. 12 is a graph illustrating a shift of a bandpass of wavelengths versus thickness for a dual-resonance, referencing optical sensor device according to certain principles of the present invention.

FIG. 12 is a graph illustrating reflected wavelengths of light. Notably, a difference between peak wavelengths changes depending on a thickness of layer 832. For example, the difference between peak wavelengths increases in response to increased thickness of layer 832. The three curves of the graph illustrate change in peak reflected wavelengths for layer 832 thicknesses of 0 Angstroms, 200 Angstroms and 500 Angstroms, respectively.

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus for detecting the presence and concentration of matter in contact with a surface structure optical filter by observation of a shift in the wavelength of filtered electromagnetic waves, the apparatus comprising:

a first substrate having a surface relief structure containing at least one dielectric body with physical dimensions smaller than the wavelength of the filtered electromagnetic waves, such structures repeated in a one or two dimensional array covering at least a portion of the surface of the first substrate, said surface relief structures of the substrate being composed of or immersed in a material sufficient to form a guided mode resonance filter; and a sample material deposited on the surface relief structures, thereby producing an observable shift in the wavelength of the filtered electromagnetic waves in proportion to the amount of sample material accumulated.

2. An apparatus as in claim 1, wherein the spacing of the surface relief structures in the array is substantially the same and less than the wavelength of the filtered electromagnetic waves.

3. An apparatus as in claim 1, wherein the individual dielectric bodies in the surface texture are arranged in a two dimensional array forming a honeycomb pattern with circular symmetry.

4. An apparatus as in claim 1, wherein the individual dielectric bodies in the surface texture are circularly shaped.

5. An apparatus as in claim 1, wherein the propagation direction of electromagnetic waves resonantly reflected from the surface structures, or transmitted through the substrate, is not materially altered by the accumulation of sample material on the surface structures.

6. An apparatus as in claim 1, wherein the individual dielectric bodies comprising the surface texture have cylindrical, elliptical, square, rectangular, or octagonal cross sectional profiles.

7. An apparatus as in claim 1, wherein the individual dielectric bodies comprising the surface texture are lines with a width less than the wavelength of the filtered electromagnetic waves and a length substantially equivalent to the apparatus dimension, repeated in an array with a spacing less than the wavelength of the filtered electromagnetic waves.

8. An apparatus as in claim 1, wherein the substrate comprises glass or plastic.

9. An apparatus as in claim 1, wherein the dielectric bodies comprising the surface relief structures are comprised of a material selected from the group consisting of zinc sulfide, titanium oxide, tantalum oxide, and silicon nitride.

10. An apparatus as in claim 1, wherein the surface relief structure is a conductive material.

11. An apparatus as in claim 1 further comprising a conductive material to allow an electric field to be applied.

12. An apparatus as in claim 1, further comprising a second resonant structure coupled to the first substrate to provide a static reference signal which can be used to determine the difference between a shifted signal due to a deposited material layer and a shifted signal due to varying ambient conditions.

13. An apparatus as in claim 1, wherein the sample material comprises an organic substance.

14. An apparatus as in claim 1, wherein the sample material comprises an inorganic substance.

15. An apparatus for detecting the concentration of matter in a material layer by observation of a shift in the wavelength of filtered electromagnetic waves, the apparatus comprising:

a substrate having a surface relief structure containing at least one dielectric body with physical dimensions smaller than the wavelength of the filtered electromagnetic waves, such structures repeated in a one or two dimensional array covering at least a portion of the surface of the substrate; and a material coating the surface relief structures of the substrate to form a guided mode resonance filter; and a top material layer which adheres or chemically binds to a sample material thereby producing an observable shift in the wavelength of the filtered electromagnetic waves.

16. An apparatus as in claim 15, wherein the spacing of the surface relief structures in the array is substantially the same and less than the wavelength of the filtered electromagnetic waves.

17. An apparatus as in claim 15, wherein the bodies comprising the surface relief structure are arranged in a two-dimensional pattern such as a honeycomb.

18. An apparatus as in claim 15, wherein the surface relief structure is composed of a conductive material suitable for applying an electric field.

19. An apparatus as in claim 15, further comprising a second resonant structure coupled to the first substrate to provide a static reference signal which can be used to determine the difference between a shifted signal due to a deposited material layer and a shifted signal due to varying ambient conditions.

20. An apparatus as in claim 15, wherein the individual dielectric bodies comprising the surface texture have cylindrical, elliptical, square, rectangular, or octagonal cross sectional profiles.

21. An apparatus as in claim 15, wherein the individual dielectric bodies in the surface texture are lines with a width less than the wavelength of the filtered electromagnetic waves and a length substantially equivalent to the apparatus dimension, repeated in an array with a spacing less than the wavelength of the filtered electromagnetic waves.

22. An apparatus as in claim 15, wherein the substrate comprises glass or plastic.

23. An apparatus as in claim 15, wherein the dielectric bodies comprising the surface relief structures are comprised of a material selected from the group consisting of zinc sulfide, titanium oxide, tantalum oxide, and silicon nitride.

24. An apparatus as in claim 15, wherein the sample material comprises an organic substance.

25. An apparatus as in claim 15, wherein the sample material comprises an inorganic substance.

* * * * *